United States Patent [19]

Rhoades et al.

[11] Patent Number: 5,248,077
[45] Date of Patent: Sep. 28, 1993

[54] FRICTION WELDING AND WELDS MADE BY FRICTION

[75] Inventors: Lawrence J. Rhoades, Pittsburgh; James R. Gilmore, Ligonier, both of Pa.

[73] Assignee: Extrude Hone Corporation, Irwin, Pa.

[21] Appl. No.: 971,162

[22] Filed: Nov. 3, 1992

[51] Int. Cl.⁵ ............................................. B23K 20/12
[52] U.S. Cl. ................................... 228/112.1; 228/2.1
[58] Field of Search .............................. 228/112-114, 228/265; 156/73.5

[56] References Cited

U.S. PATENT DOCUMENTS

| | | | |
|---|---|---|---|
| 3,732,613 | 5/1973 | Steigerwald | 228/2 |
| 3,734,383 | 5/1973 | Ritter et al. | 228/112 |
| 4,462,849 | 7/1984 | MacLaughlin et al. | 228/112 |
| 4,515,651 | 5/1985 | MacLaughlin et al. | 228/2 |

OTHER PUBLICATIONS

Craine, et al., "Frictional Heat Generated in the Early Stages of an Orbital Friction Welding Process," Wear, 114, pp. 355-365.
Searle I, "Orbital Friction Welding: Theory into Practice," Design Engineering Sep., 1971, pp. 48-50.
Searle II, "Friction Welding Moves into a New Orbit," Metalworking Prod., Jul., 1971, pp. 72-74.
"Friction Welding Lines Up More Jobs," Machinery and Production Engineering, May 2, 1979, pp. 41-43.
Nicholas, "Fabricating by Friction," Engineering, Apr., 1985, pp. 254-256.
Watson, "Welding Plastics for the Automotive Industry," SAE Technical Paper Series, No. 860581, Feb. 24-28, 1986.
"Linear Friction Enables Non-Circular Metal Welding," Eureka, Mar., 1989, pp. 75-79.

Primary Examiner—Samuel M. Heinrich
Attorney, Agent, or Firm—Waldron & Associates

[57] ABSTRACT

Friction welding is preformed by linear or non-rotating orbital motion in which both parts to be joined by friction welding are moved in identical paths, out of phase to produce friction until welding temperature is attained, and then in phase, with the parts registered in alignment, during the bonding phase. Because the registered, in phase control of the mechanism is attainable with great certainty and rapidity, friction welding with a far higher precision and accuracy of alignment is attained. The high precision and accuracy of the technique permits application of friction welding to fabrication of parts, such as turbine engines, not usually made by such techniques. A preferred apparatus for practice of the invention involves an opposed pair of orbital tables (110 and 120), on which parts to be joined are mounted and fixed in place by mounts 113 and 123). The parts are aligned and registered and drives (111 and 121) then cause the parts to orbit while they are pressed together by pressure means (14), until friction heats the joint surfaces to welding temperatures.

6 Claims, 5 Drawing Sheets

FRICTION WELDING AND WELDS MADE BY FRICTION

BACKGROUND

1. Prior Art

Friction welding has a long and successful history, and has proven effective with a substantial number of metals.

In the most general terms, friction welding is performed by rubbing contact between mating surfaces of two pieces of metal under sufficient pressure that the level of heat generated by the resulting friction elevates the temperature of the contact areas to welding temperature. Once the temperature level is sufficient, the rubbing motion is halted, and the two pieces are pressed together to form a weld at the heated contact area.

In circumstances to which friction welding is applicable, excellent weld joints are obtained. Indeed, friction welding is often superior to other techniques of welding, particularly when unlike metals are joined. A wide diversity of metals may be joined to themselves and to other metals by friction welding. In addition, no extraneous materials are employed, and a well performed friction weld provides strength as high as that of the substrate metal.

The rubbing contact of friction welding has been attained by providing relative rotation or relative reciprocal linear oscillation of the workpieces for the time and at the pressure required to attain effective welding temperatures. Such relative motions are ordinarily obtained by holding one part stationary while the other is rotated or oscillated with the surfaces to be welded pressed together in frictional contact. In a few cases, motion of both parts has been employed, by counter-rotation or counter-oscillation of parts. In a few systems, the superimposition of other motions on the base rotary or linear oscillatory motion have been suggested. The limitations of friction welding are dictated by the consequences of the relative motions employed. Of course the system is constrained by the requirement for the shapes and particularly the contact areas, which must be compatible with the relative motions required. In addition, the formation of a weld bond is rapid when the relative motion is stopped, typically within less than 1 second, and often as little as 0.2 seconds or less, and the precision of the alignment of the pieces is often limited by the inertia of the relative motion mechanisms and of the equipment employed to attain such motion. The inertia of the system is an important factor, because the initial bonding of the parts is extremely rapid and often occurs before the alignment of the parts to be joined can be attained. Alignment and bonding are performed when the drive mechanism and the relative motions are stopped. It is generally impossible to employ friction welding when high precision is required. If temperatures become too high, the metals of the parts may seize and bond with no alignment, and potentially causing damage to the part or to the welding mechanism.

The difficulties of friction welding with rotary motion are made considerably more complex if the rotating part does not have symmetry about the axis of rotation. While slight asymmetry can be accommodated in some systems, the rotary imbalance of parts further degrades the accuracy and precision of the operation, and limits the parts with which the techniques can be employed. Substantial asymmetry precludes the use of rotary friction welding.

In addition, friction welding has heretofore been limited to joints which are at least generally circular or linear in the contact area between the parts to be joined, and have not been employed where more complex shapes are to be joined.

2. Needs in the Art

There are a number of industrial manufacturing operations and fabrications which would be highly desirable candidates for the employment of friction welding if the precision of alignment required could reliably be attained. A representative example of such fabrication is the attachment of turbine blades to turbine rotors and stators in the manufacture of turbine engines for jet engines.

At the present time, turbine blade-rotor structures and turbine blade-stator are commonly made by one of two techniques. Either the piece is machined from a solid monolithic block, or the blades are provided with a keying structure, commonly referred to as a Christmas tree, inserted into a mating keyway slot.

Both techniques have disadvantages. The monolith approach requires exceedingly complex and expensive machining techniques, and does not admit of repair or replacement of individual blades. The Christmas tree approach affords greater flexibility but requires considerable manufacturing cost and adds to the weight of the component to provide the mass and bulk required to achieve the necessary strength under the extremes of operation of a turbine engine.

It would be highly desirable, both for ease and economy of manufacture, and for rework or repair of the parts, if the blades could be welded to the rotor or stator. Welding has not heretofore been employed in the manufacture or repair of such structures, however. Friction welding is not employed because of the difficulties in attaining adequate, reliable and certain alignment of the parts. Other welding techniques are not used because of the limited strength of weld joints and related difficulties.

Techniques for use with asymmetric parts having non-linear joints and greater flexibility in joint design are also needed in the art.

Orbital motion has been proposed in the art. See for example:

Craine, et al., "Frictional Heat Generated in the Early Stages of an Orbital Friction Welding Process," Wear, 114, pp. 355-365, Elsevier, Den Hague, 1987, propose combining rotation and orbital motions, where the parts to be joined are rotated in mating configuration, in the same direction and at the same speed, and where the axis of rotation is moved in an orbital path to produce friction until welding temperature is attained, whereupon the axes of rotation are brought back into coincidence, so that the relative motion between the parts is terminated. The Craine, et al., strategy does not eliminate the requirement for rotating parts, resulting in complex and difficult to control equipment.

Searle I, "Orbital Friction Welding: Theory into Practice," Design Engineering, September, 1971, pp. 48-50, discloses orbital welding where one element is orbited while the other is held stationary. Such operations are difficult to control because of the difficulty of controlling the position and relative alignment of the pieces while braking the orbital motion and alignment inaccuracies result.

Searle II, "Friction Welding Moves into a New Orbit," Metalworking Prod., Jul. 1971, pp. 72-74, is cumulative to Searle I, supra.

"Friction Welding Lines Up More Jobs," Machinery and Production Engineering, May 2, 1979, PP. 41-43, inter alia, discusses the limitations of the procedure disclosed by Searle I and II, supra.

MacLaughlin, et al. U.S. Pat. No. 4,462,849, discloses and claims axial oscillatory welding. No orbital component is disclosed.

MacLaughlin, et al. U.S. Pat. No. 4,515,651, is a Continuation in part of MacLaughlin U.S. Pat. No. 4,462,849, supra and is cumulative in import.

Nicholas, "Fabricating by Friction," Engineering, Apr., 1985, pp. 254-256, discusses the procedure of the type disclosed in Craine, et al., supra, and is cumulative in substance.

Watson, "Welding Plastics for the Automotive Industry," SAE Technical Paper Series, No. 860581, Feb. 24-28, 1986, discloses a variety of plastic welding techniques in a survey, including orbital friction welding of thermoplastic polymers.

"Linear Friction Enables Non-Circular Metal Welding," Eureka, Mar., 1989, pp. 75-79, discloses linear oscillatory friction welding wherein the parts are periodically realigned in differing orientation relative to one another to attain better and particularly more uniform surface heating. A rotary motion coupled with lateral translation is also discussed.

SUMMARY AND OBJECTS OF THE INVENTION

It is an object of the present invention to provide a technique for friction welding, and particularly a technique for assuring precise alignment of parts.

Another object is to provide a mechanism and technique for assuring precise alignment of parts during the bonding phase of friction welding whereby high precision, reproducibility and accuracy are attained in the resulting joint and between the mated parts.

Still another object resides in the provision of welds having high precision and accuracy at the full strength of friction welding techniques.

Yet another object is to provide fabricated products having high precision and accuracy when fabricated by friction welding and to permit the fabrication of products by friction welding which have heretofore required other, less desirable techniques.

These and still other objects, as will be made clear in the following disclosure, are achieved by the friction welding techniques of the present invention. In brief summary, the welding technique is based on the provision of relative motion between two parts to be joined by friction welding in equipment which can provide such appropriate motions to both parts both out of phase and in phase. The classes of motion include linear oscillation and non-rotating orbital motion in a plane. The orbital motion will most simply be a circular orbit, but may also be elliptical or other regular shape, or an irregular or random shape when desired or required by the nature of the parts to be joined. When the motions are performed out of phase, with applied pressure, the parts to be joined are in frictional rubbing motion. At welding temperature, the motions are brought into phase with applied pressure, so that while the movement of the parts continues, the relative movements of each is identical to the other, so that no relative motion between them results during the bonding phase of the welding operation.

The present invention provides these results by a method for precision friction welding mating surfaces of two metal parts comprising the steps of confining a first part in a first driving mechanism adapted to impart a planar motion to said first part, confining a second part in a second driving mechanism adapted to impart a planar motion to said second part, aligning said first and second driving mechanisms so that the planes of motion of said first part and said second part are parallel and contiguous, driving said first part in said planar motion, driving said second part in said planar motion out of phase with the motion of said first part to produce relative motion between said first part and said second part, applying pressure between said first part and said second part so that said relative motion produces friction and heat for a time sufficient to raise the temperature of the surfaces of said first part and said second part to welding temperature, and thereafter bringing the motion of the first driving mechanism and the second driving mechanism into phase to stop relative motion between said first part and said second part in alignment while applying weld bonding pressure between said first part and said second part until said parts form a welded bond.

DESCRIPTION OF THE INVENTION

Description of the Invention

Figure 1:
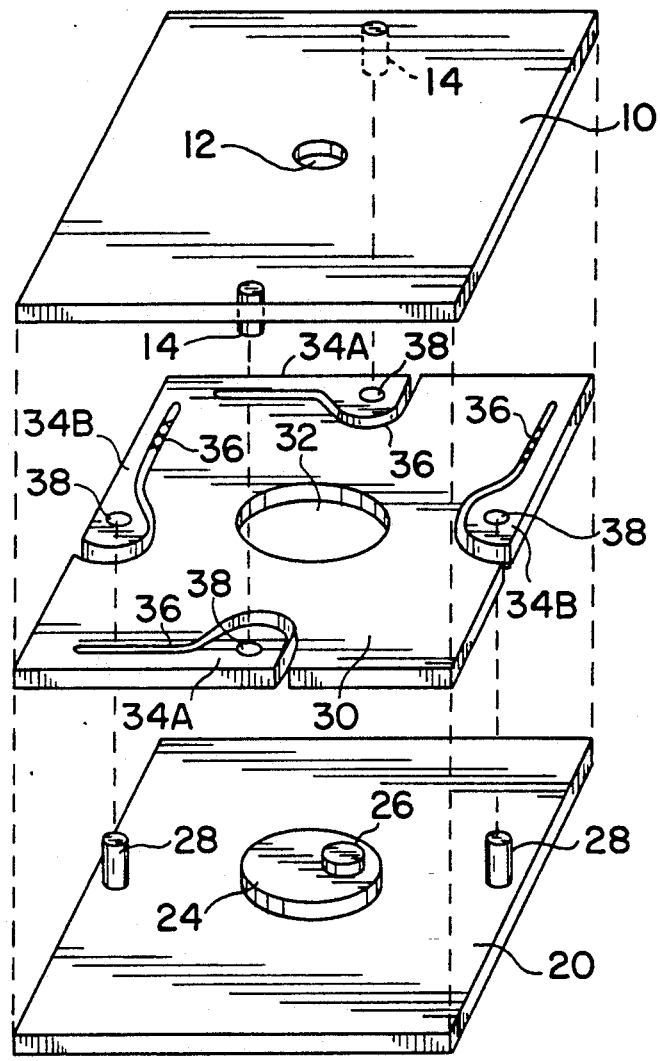
FIG. 1 is an isometric view of a preferred embodiment of this invention illustrating the three major components of the orbital table in a spaced apart relationship.

In common with other friction welding techniques, the present invention requires bringing together the intended mating surfaces of the parts to be joined and, through the imposition of relative motion and pressure, to employ the resulting friction to bring the surfaces to welding conditions of high temperature and pressure, at which condition the relative motion is stopped and the weld is formed.

The appropriate temperatures and pressures vary, as a function of the metals to be joined. The heat generating conditions are to a degree interdependent, with high velocity of the relative motion permitting a lower applied pressure, while lower velocity may be employed if the pressure is increased.

In the present invention, the relative motion will be either a linear oscillation or a non-rotating orbital motion. Through the employment of one of these relative motions, a wide variety of joint configurations can be employed, including some to which friction welding has never before been possible.

Through the provision of motion of both parts to be joined in the same path, out of phase during the friction heating phase of the operation, and then bringing these motions into phase when welding temperatures of the parts has been attained, a high degree of precision, accuracy and reproducibility of alignment of the parts during the bond formation is achieved.

By the technique of the present invention, friction welding can now be employed in operations which require such high levels of accuracy, precision and reproducibility, and where prior techniques of friction welding or other welding techniques have not been employed because of the lack of these features.

It has long been known that friction can rapidly produce sufficient heat to effect welds. The level of friction is well known to be dependent on the coefficient of friction of the surfaces, the rate of motion, and the applied pressure between the surfaces. Under the conditions applicable to friction welding the coefficient of friction of materials is that intrinsic to the material and is largely independent of surface parameters such as roughness and the like, although such parameters may be relevant to the earliest stages of the friction heating. As the surfaces are heated and abraded by the applied friction, surface finish characteristics are soon altered and cease to affect the operation.

The increase in temperature at the interface between frictionally engaged parts is, in turn, a function of the applied friction, and the heat transfer properties of the metals and alloys to which the invention is applied, and the duration of the operation.

The temperature and pressure appropriate to the formation of the weld bond are ordinarily dependent on and determined by the particular properties of the metals to be joined.

It is characteristic that the weld bond forms very rapidly when the relative motion between the parts is stopped by bringing the motions of the parts into phase. Indeed, it is the extreme rapidity of the bond formation which has led to the alignment limitations of prior friction welding techniques. Overcoming these limitations is one of the most important characteristics and features of the present invention.

For each pair of metals to be joined, whether the two parts to be joined are the same metal or different metals, there is generally a range of controlling parameters which are somewhat interdependent. The conditions are not narrowly critical, but bonding and operating efficiencies are enhanced by the selection of parameters appropriate to the specific metals to be joined, consistent with the equipment to be employed.

During the heating phase of the operation, the controlling parameters are the period of the orbit or oscillation, the displacement of the linear oscillation path or the eccentricity of the orbit, the duration of the oscillation or orbit, and the applied pressure.

During the bonding phase, the controlling parameters are the bonding pressure applied across the joint, bond forming temperature, and the alignment of the parts. Alignment is dictated by the phase synchronization, the maintenance of the positional orientation of the parts in their fixtures during bond formation, and the accurate design allowances of the degree of joint upset and material flow at the bonding temperature.

It should be noted that the bonding temperature and pressure are not per se narrowly critical parameters, and may be varied within substantial ranges for any given metallic pair of parts. Some account should be taken of their effect on the volume of upset material produced and the flow of metal at the joint interface. Generally speaking, higher temperature and pressure produce higher flow and upset volume. Since these are independently variable, it is generally simple to control each to produce a weld with appropriate characteristics and conformity to joint design specifications.

In general terms, the present invention is dependent on relative motion where both faces of the weld joint are in motion during the heating phase of the operation, which motions are brought into phase when the conditions of the joint are appropriate. While both will continue in motion, at least for a brief period, the relative motion between the parts is stopped by virtue of synchronizing the motions so they are in phase and identical. The change of phase of the motions of the mating parts can be accomplished with far greater precision and speed than are possible when alignment of the parts is dependent on stopping the motion of one or both the parts.

The motions of the parts to be joined are planar and, except for the controlled variation in phase, will generally be identical with reference to an external frame of reference. Motions which are rapid, planar, phased, and controllable may be employed. Chief among these are oscillating linear, non-rotating orbital, and rotating orbital motions. In the present invention, oscillating linear and non-rotating orbital movements are preferred.

Reciprocal or oscillatory linear motion is preferred for the facility with which it can be produced and controlled, and for the wide variety of mechanisms which are available to produce such motions.

Non-rotating orbital motion is produced by a variety of known mechanisms, and is preferred for the wider diversity of joint configurations and shapes which can be friction welded.

Motions involving both rotation and orbital motion are also known, where the orbit is defined by movement of the axis of rotation. Such mechanisms are generally more expensive, complex and difficult to control, and are less preferred for these reasons, but may be employed in the present invention if desired.

In most circumstances, it will be appropriate to employ an amplitude of oscillation between the moving surfaces of from about 0.01 to 0.5 inches (0.254 to 12.70 mm), most often in the range of about 0.05 to 0.15 inches (1.27 to 3.81 mm). When narrow segments of parts are to be joined along an edge, the amplitude of the oscillations is generally in the lower end of the range.

The oscillations can have a period in the range of about 1 to about 120 Hz, preferably about 2 to 60 Hz.

The pressure requirements of the procedure are dependent on the two fold requirements of heating and bonding. During heating, the pressure applied between the parts at the joint should be dictated by the heating requirements of the particular metals being joined, dictated largely be the frictional characteristics of the metals, and the speed and amplitude of the oscillations, and the phase and drive requirements of the oscillatory drive mechanism. During the bonding phase, different criteria apply, notably those which produce the optimum weld characteristics, and are generally characteristic of the metals being joined.

The time required for the welding procedure is a function of the materials being joined, the pressure applied to the joint, and the rate and amplitude of the relative oscillatory motion. It is generally preferred to stop the relative motion as soon as conditions appropriate to the formation of the weld are attained, although the motion can be continued for longer periods. If the relative motion is not sustained for an adequate period, an inferior weld will result.

During the oscillatory motion, whether linear or orbital, a portion of the mating surfaces is exposed during each period. When the configuration of the parts permits, it may be desirable to monitor surface temperature by a remote sensor, such as an infrared temperature sensor.

If temperature measurement is not possible, care must be taken to balance the parameters which produce the high temperature levels to assure adequate heating and to avoid heating to excessive temperatures. Under the preferred conditions of the present invention, the temperature rise of the weld interface is quite rapid. Excessive temperatures may produce excessive material flow and excessive upset volume and, in extreme cases, may even cause the parts to seize and bond prematurely with a random, unpredictable and uncontrollable alignment.

The alignment of the phases which serves to terminate the relative motion between the parts should generally be as rapid as the mechanisms can provide, and should be less than 1 second, preferably less than about 0.25 second, and still more preferably less than about 0.1 second. If alignment of phases is too slow, the joint may be misaligned when the bond is formed. The rate of the phase alignment must be balanced with the requirement for accuracy in alignment.

Through the use of non-rotating orbital paths, the technique of friction welding is applicable to a wide variety of joints not possible by other techniques.

For example, with appropriate fixtures, parts having no axis of symmetry can be orbited with little difficulty. The only requirement to achieve suitable alignment during the relative motion is to assure that the orbits and alignment of the mating surfaces to be welded are established and maintained.

With non-rotating orbital motions, the shape of the weld interface between the mating parts to be joined is not required to be round or nearly so. The only constraints on joint design in the present system are that the mating surfaces be parallel in the plane of the orbit.

It is preferred, for the simplicity of operation that the joint design provide for complete contact of the joint surfaces of both mating parts during the full orbital path. It is possible, as in the case of tube-to-tube welds, for example, that a portion of the joint surface may overhang or be out of contact with the mating surface during a portion of the orbital period, but it is preferred that such operations be avoided when possible because the duration of the heating step of the procedure is longer and more difficult to control. When such joint designs having an overhang during any part of the orbit are required, it is generally helpful to maximize the orbital period and the applied pressure and to minimize the eccentricity of the orbit in relation to the conditions required for the specific metals to be joined by such a joint.

In general terms, the present invention is applicable to all weldable materials, and includes a few materials not ordinarily joined by welding techniques. These materials include aluminum and a broad variety of aluminum alloys, brass, bronze, metallic carbides, such as tungsten and titanium carbides, cobalt based alloys, columbium, copper, cupronickel alloys, lead, magnesium alloys, molybdenum, nickel alloys, mild steel, carbon steel, free-machining steel, maraging steel, stainless steel, tool steel, sintered steel, tantalum, titanium and titanium alloys, tungsten and zirconium, as well as more complex alloys of many of the foregoing elements and metals.

The metals and alloys may be welded to themselves or other such metals or alloys. Even quite diverse and difficult to join combinations of metals and alloys may be welded by the techniques of the present invention, such a joining aluminum to steel, aluminum to copper, or titanium to itself or other metals, for example.

The major parameters which govern the welding operation are the temperature attained by the friction, and the pressure applied across the joint at the time the bonding occurs. Also significant to the operation are the frequency and amplitude of the motion, its duration, and the applied pressure during the heating (which may be the same as or different than that during bond formation), the initial condition of the surface of the metals to be joined, and interfacial conditions during the operation.

The appropriate conditions are largely dictated by the properties and characteristics of the metal or metals to be joined, and vary considerably. Suggested parameters for a variety of metals and combinations of metals is provided in Table I, although it should be understood that these may be varied to adapt to the requirements of specific equipment, joint designs, and the like. The values in Table I are based on an orbital path having a period of 60 Hz, and eccentricity of 0.125 inches (3.175 mm); during the heating phase, the orbits are 180 degrees out of phase, and are brought into phase, and the relative motion stopped, within 100 milliseconds.

TABLE I

|  | Heating P.(1) | Weld P.(2) | Time(3) | Energy(9) |
|---|---|---|---|---|
| Carbon Steel(4) | 5,000 | 5,000 | 7 | 24–30,000 |
| Stainless Steel | 7,500 | 7,500 | 15 | 30,000 |
| Carbon/Stainless Steels | 7,500 | 15,000 | 10 | 30,000 |
| Tool Steel(6) | 15,000 | 20,000 | 10(8) | 40–50,000 |
| Copper(7) | 5,000 | 10,000 | 18 | 10,000 |
| Aluminium(7) | 4,000 | 6,500 | 6 | 15–18,000 |
| Titanium(6–4) | 8,000 | 12,000 | 7 | 15–20,000 |
| Aluminium/Stainless | 5,000 | 15,000 | 5 | 20,000 |
| Copper/Aluminium | 5,000 | 15,000 | 3 | 20,000 |

(1)Pressure in p.s.i.
(2)Pressure in p.s.i.
(3)Heating phase in seconds
(4)AISI 1010, 1020, 1030, 1045 and similar
(5)Series 300 and 400
(6)Type T-1 and similar
(7)Alloying can substantially alter parameters
(8)Post-weld treatment required
(9)Energy in Ft.-Lbs.
The parameters set out in Table I provide general guidelines. Good weld properties will result over a broad range of variables. The weld energy input to the weld joint, the heating pressure and heat cycle time are all varied to control the breadth of the heating zone on either side of the weld joint. The weld pressure and energy input dictate the weld flush volume. Particularly when welding dissimilar alloys, the time should be as short as reasonable to minimize diffusion at the inte For most metals, little surface preparation is required, although major features, such as mill scale and the like, are desirably removed before joining. At the times and temperatures involved, surface coatings, lubricants and corrosion inhibitors and the like will be destroyed and removed, and it is not strictly necessary to remove such materials, although it is generally preferred that the surface be clean, dry and bare metal if such conditions can be reasonably achieved.

The surfaces to be joined as subjected to the friction heating will be considerably abraded, smoothed and altered by the operation. There is no requirement for conditioning the surfaces in preparation for welding other than the removal of gross imperfections.

Heat build-up and temperature rise at the surface of the parts is generally quite rapid. As a general matter, it is ordinarily desirable to operate under conditions which minimize the time required to attain suitable welding temperature to limit the time for heat transfer and the potential for heat distortions within the parts and to limit the energy input required for the operation.

During the welding operation, a layer of the heated metal at the weld surface will become melted or softened, and will flow under the applied pressure. Thus at the outer boundaries of the joint there will be the formation of an extrudate of upset material, comparable to a weld bead formed in other welding procedures. Allowance for the amount of material loss must be taken into account in the dimensioning of the parts to be welded. The amount of upset material will be dependent on the specific welding conditions employed and the properties of the metals or alloys joined.

The flow of upset material will produce a definite structural orientation in the metallic microstructure of the weld joint which should also be considered in the design of parts unless the resulting microstructure is altered by heat treating procedures after welding.

If no upset is formed, or the amount is insufficient, it is generally the case that a less than maximum strength weld is produced. Both joint design and operating conditions should provide for adequate flow and upset formation to assure that the full area of the weld interface is homogeneous and uniform.

Upset material is generally readily removed by the same techniques employed for removing welding bead, such as grinding, honing and related operations. For some metals, grinding away the upset can be facilitated by annealing the weld and upset material.

In a well-formed weld, the strength of the joint is ordinarily the same as that of the parent metal or alloy, consistent with the heat history of the material. Because there are no extraneous materials or inclusions introduced, the characteristics of the joint are not affected by such inclusions. In addition, the exclusion of air or other gases during the welding prevents the occurrence of any modifications of the metal at the weld joint common to other types of welds.

The high degree of homogeneity of the weld is ordinarily an important benefit of the technique. The microstructure of the weld joint will be dictated by the heat history as those of ordinary skill in the art will understand, and is dictated by the peak temperature, the time at peak temperature, and the rate of cooling during and after bond formation. The microstructure of the metal of the starting parts may also be a factor in some cases.

The heat history of the weld will often, indeed normally, be different from that of the parent metal of the welded parts. Post-welding heat treatments such as quenching, tempering, annealing or the like can achieve homogeneous properties throughout the welded structure, so that the same properties are attained in the weld as in the remainder of the part.

It is accordingly preferred in most circumstances to conduct heat treatments of the welded piece after welding rather than heat treat the component parts prior to welding.

While the invention has been described in relation to metals and metal alloys, it is equally applicable to welding of any material which heat weldable, including materials such as metallic carbides and thermoplastic polymers, such as polyolefins, polyvinyl and polyvinylidene halides, acrylic polymers, polycarbonates, polyesters and the like. For such materials, the present technique will not often be preferred, as there are many other techniques which are quite effective, but there may be cases in which the present invention will offer sufficient advantages in speed, the strength of the bonds attained, or in the avoidance of entrainment of foreign materials as inclusions in the weld body, when the use of the invention disclosed in the present application may be the technique of choice.

Description of the Best Mode

The best mode for practicing the invention as contemplated by the inventor is an orbital friction welding machine and method.

The orbital motion is preferred because of the greater number of joint configurations that can be employed and the design flexibility that is afforded, alignment in operation is simple, in that the parts are inherently aligned in a planar arrangement by the set up of the equipment and of the parts to be welded, and the control of alignment during the welding operation is facile. In addition, the drive mechanisms required are simple, readily controlled and readily available in configurations designed for precision and, as a result, high accuracy, precision and reproducibility of alignment are more readily attained.

A preferred mechanism for orbital friction welding is based upon and derived from the orbital table assembly disclosed and claimed in Rhoades, et al., U.S. Pat. No. 4,891,916, issued Jan. 9, 1990, commonly assigned with the present invention. That prior invention provides a new simple, reliable and low cost translational and orbital table for use in any application where such tables are currently utilized, and in particular for use on, or in conjunction with, machine tools, to which a workpiece can be affixed and made to orbit in an orbital path or otherwise translated without rotation. Because of its low cost, the orbital table has found particular utility in machining operations where all that is needed is to have a work table that will orbit in a circular or elliptical path. In addition to its being greatly simplified and lower in cost, as compared to conventional X-Y tables, the orbital or translational table provides added advantages of being more accurate, lighter in weight, capable of being produced at considerable size reductions with a comparatively low profile form and is characterized by a lower power loss than conventional prior art tables. The orbital table is normally fabricated to effect a given movement, and accordingly has no mechanism or adjustments for changing the movement which will adversely affect the accuracy of movement. In addition, the orbital table of this invention does not utilize any sliding linkage as is found in most X-Y tables, which tend to loosen quickly with use and wear to further adversely affect the accuracy of the rotation and precision of control. Accordingly, the orbital table of this invention provides the added advantage of maintaining the desired fixed motion without loss in accuracy due to the wearing of sliding linkage, and without any need for concern that the adjustments could be inadvertently moved to unknowingly alter the movement, and therefore without any need to periodically check the adjustments to assure the proper settings.

Accordingly, it is an object of the present invention to provide a new, improved and novel adaptation of such an orbital table for orbital friction welding applications.

In usage, friction welding is produced by mounting each part to be joined in an aligned orientation, with the surfaces to be joined in the weld disposed parallel to the plane of the orbit on one of a pair of complementary orbital tables, registered so that the mating faces engage in the required alignment, beginning the orbiting action of both of the complementary orbital tables, registered so that the mating faces engage in the required alignment, beginning the orbiting action of both of the complementary tables out of phase, and applying heating pressure by advancing the parts together while maintaining registered alignment and orbital motion. When welding temperature is attained, the drive mechanisms of the orbital tables are brought into phase so that the relative motion between the parts produced by the out-of-phase orbits is terminated.

Figure 2:
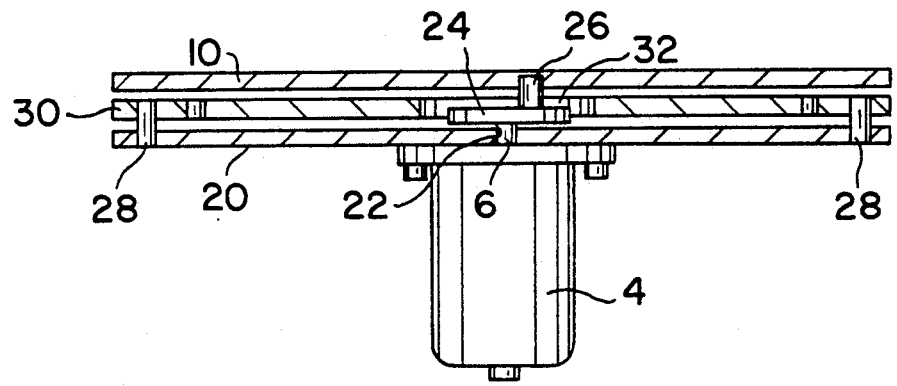
FIG. 2 is a sectional side view of the orbital table illustrated in FIG. 1 with the section taken at line 2—2 depicted in FIG. 3.

Each orbital table component is constructed and operates in accordance with the following description:

With reference to FIGS. 1 and 2, a preferred form for use in this invention consists merely of three essential plate components, namely a tool plate (10) at the top, a drive plate (20) at the bottom and a linkage plate (30) therebetween. Drive plate (20) at the bottom, forms the base member for the orbital table and should be secured and fixed on the machine base as described below. A rotational drive means, such as an electric motor (4) is secured to the underside of drive plate (20) with its arbor (6) extending vertically upward through hole (22) in the center of, and perpendicular to, the upper surface of drive plate (20). A drive spindle (24), having a relatively short cylindrical body, is secured to the motor arbor such that activation of electric motor (4) will cause the rotation of drive spindle (24) in a plane parallel to and just above the top surface of drive plate (20). A spindle cam (26) is secured to the top surface of drive spindle (24) with its axis offset a predetermined distance from the drive spindle axis. A pair of parallel link pins (28) are attached to the upper surface of drive plate (20) diametrically opposed on either side of drive spindle (24) with their axis perpendicular to the top surface of drive plate (20) and thus parallel to the axis of rotation of drive spindle (24). The operation and control of the drive means is described in greater detail below.

Linkage plate (30), which may, but not essentially, have the same peripheral dimensions as drive plate (20), is provided with a hole (32) through the center thereof, and with a flex-arm (34) on each side of the four sides of the rectangular linkage plate (30). As can be seen from FIG. 1, the flex-arms (34) are formed in this embodiment by cutting slots (36) through linkage plate (30) parallel to each edge of the linkage plate (30), such that an elongated portion on each edge of the linkage plate (30) forms a flex-arm (34) which is attached at only one end of the linkage plate (30) near a corner thereof. The section of metal of the flex-arms (34) must be thin enough to permit a lateral deflection of flex-arms (34) relative to linkage plate (30). Accordingly, two pairs of parallel flex-arms (34A and 34B) are formed on opposite sides of linkage plate (30), such that each pair is perpendicular to the other. Each pair of parallel flex-arms (34A and 34B) is diametrically opposed on either side of hole (32) at an angle of 90 degrees to the other pair. Each flex-arm (34) is provided with a hole (38) through the free end thereof perpendicular to the surface of linkage plate (30), with the axis thereof lying in a vertical plane passing through the axis of rotation of said drive spindle (24). Flex-arms (34B), and accordingly linkage plate (30) are attached to drive plate (20) by fitting the holes (38) therethrough over link pins (28) on drive plate (20), and accordingly fitting hole (32) over drive spindle (24). Preferably, link pins (28) should fit into holes (36) as tight as is necessary to prevent any pivotal action of flex-arms (34B) on pins (28). Conversely, hole (32) should be snug but loose enough on drive spindle (24) to permit rotation of drive spindle (24) without interference.

Tool plate (10), which is the orbiting plate, and which may, but need not, have the same peripheral dimensions as plates (20 and 30), is provided with a hole through the center which in essence forms a spindle cam bearing (12). A pair of parallel link pins (14) are secured to the underside of tool plate (10) diametrically opposed on either side of spindle cam bearing (12) and spaced so that they will mate with the holes through flex-arms (34A) in linkage plate (30). Accordingly, tool plate (10) is secured to linkage plate (30) by inserting link pins (14) into holes (38) and such that spindle cam (26) is rotatably fitted into spindle cam bearing (12). Since spindle cam (26) is not centered on drive spindle (24) or drive plate (20), one or both pairs of flex-arms (34) will have to be deflected somewhat in order to get spindle cam bearing (12) over spindle cam (26). As noted above for flex-arms (34B), flex-arms (34A) may be pivotally or securely connected on link pins (14).

In operation, the above described orbital table is activated by activating the rotational drive means, e.g. electric motor (4) secured to the bottom of drive plate (20). This of course will cause rotation of drive spindle (24) on its own axis, while spindle cam (26), which is offset from the drive spindle axis, will oscillate in an orbital path around the spindle axis. Since drive plate (20) is secured in a stationary position, suitable clearance must be provided at hole (22) to permit the free rotation of arbor (8) extending therethrough. As noted above, linkage plate (30) is secured to drive plate (20) via link pins Similarly, tool plate (10) is secured to linkage plate (30) via link pins (14), so that tool plate (10) cannot rotate either. However, since orbiting spindle cam (26) is inserted into spindle cam bearing (12) through the center of tool plate (10), it should be apparent that tool plate (10) will not remain stationary, but rather must move in unison with the orbital movement of spindle cam (26). Such an orbital motion without rotation is permitted by the deflection of flex-arms (34).

Figure 3:
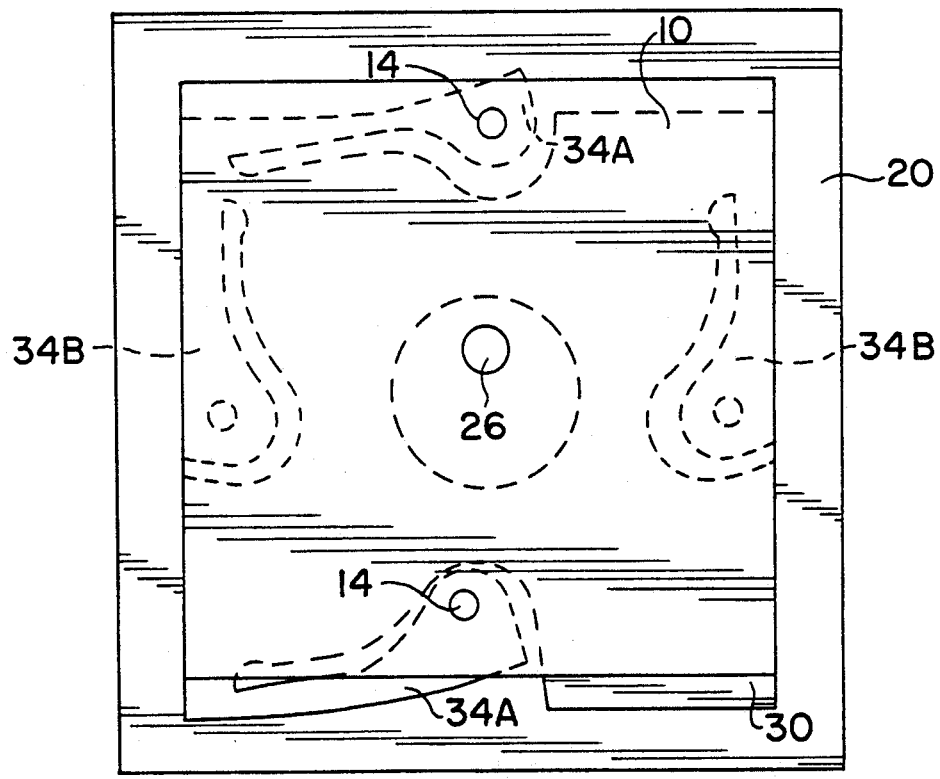
FIGS. 3, 4 and 5 are top views of an orbital table substantially as shown in FIGS. 1 and 2 illustrating three different positions of the orbital movement. Unlike FIGS. 1 and 2, the base plate in these figures is made somewhat larger than the tool and linkage plate to better illustrate the relative displacement of the plates during operation.
Figure 4:
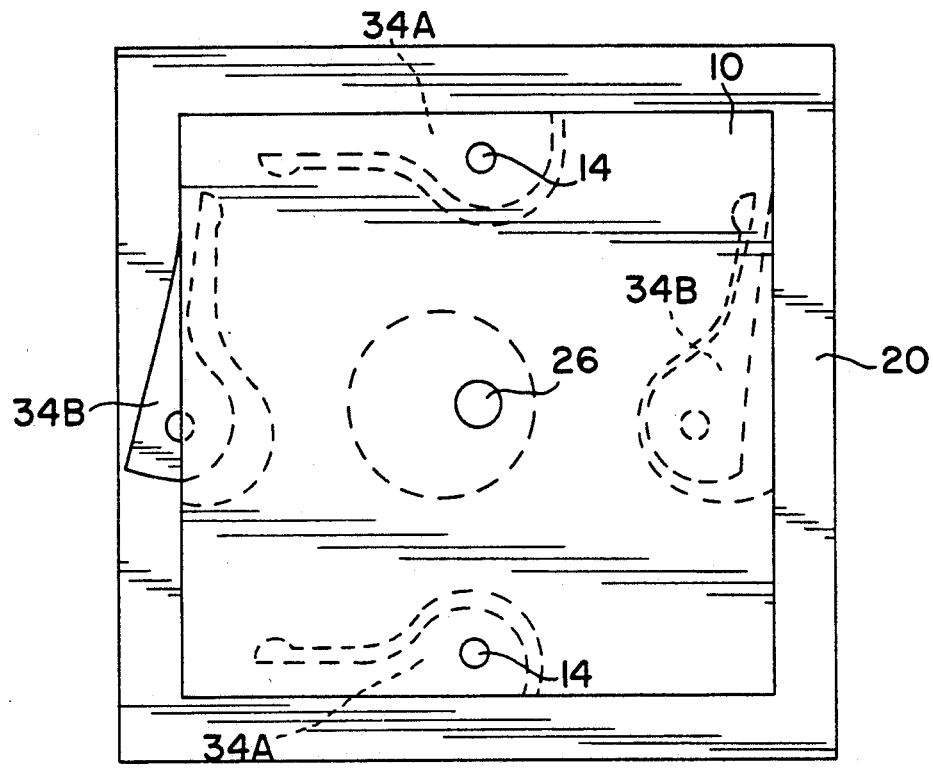
Figure 5:
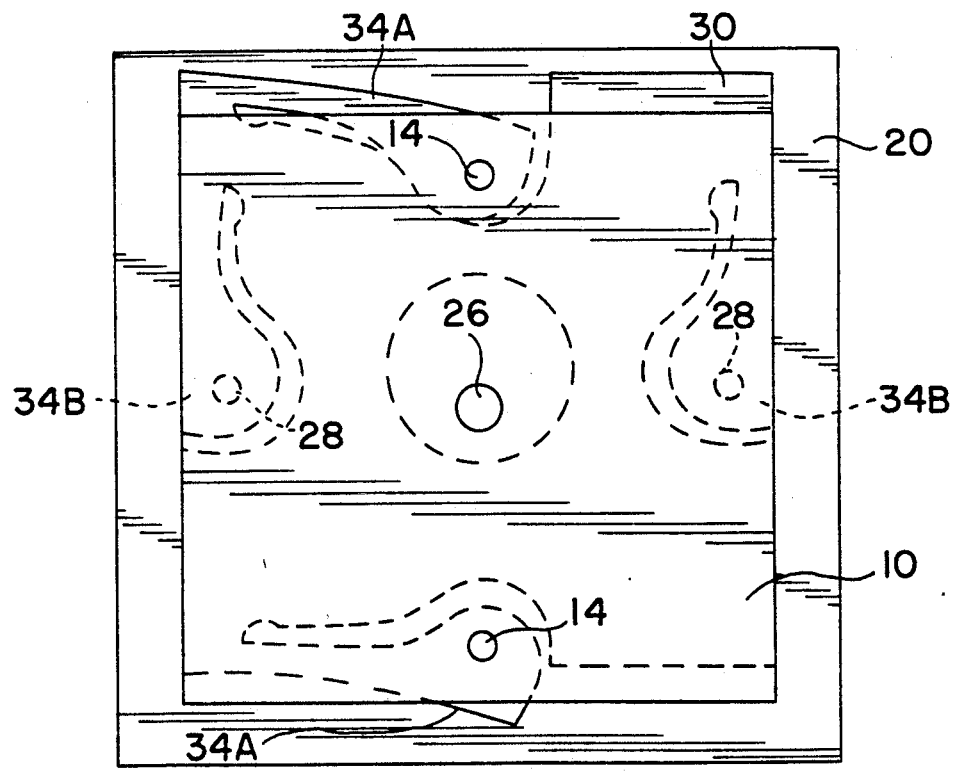

As may be apparent from a close look at the linkage of flex-arms (34), tool plate (10) cannot rotate, but oscillates in an orbital path as depicted in FIGS. 3, 4 and 5. With reference to FIG. 3, which is a top view of the orbital table, it can be seen that when spindle cam (26) is at the twelve o'clock position, tool plate (10) is positioned as far to the top side as it will go, that is, top side as viewed in FIGS. 3, 4, and 5, for example. To be moved to that position, link pins (14) will also be moved to the top side along with tool plate (10) causing flex-arms (34A) to be elastically deflected such that the free end thereof is deflected towards the top by an equal amount. Assuming a clockwise rotation of drive spindle (24), spindle cam (26) will move from the twelve o'-clock position as shown in FIG. 3 by rotating towards the three o'clock position. Tool plate (10) will of course follow the same path but without rotating. Accordingly, as spindle cam (26) rotates from the twelve to the three o'clock position, flex-arms (34A) start retracting to their normal undeflected position. The movement of tool plate (10) to the right, however, as opposed to top and bottom movement, cannot be accommodated by any deflection of flex-arms (34A). Instead, link pins (14) will pull the entire body of linkage plate (30) to the right, and thus flex-arms (34B) are elastically deflected to the left as the body of linkage plate (30) moves to the right. When spindle cam (26) is in the three o'clock position, flex-arms (34A) will have completely returned to their normal undeflected position, while flex-arms (34B), will be elastically deflected to their furthest left position, as both tool plate (10) and linkage plate (30) are moved to this furthest right position, as depicted in FIG. 4. In a like fashion, as spindle cam (26) rotates from the three to the six o'clock position, the following quarter orbital movement of tool plate (10) is permitted by the returning movement of flex-arms (34B) to their undeflected position and the deflection of interaction arms (34A) in a downward direction. FIG. 5 illustrates the relative positions when spindle cam (26) is in the six o'clock position. It can be seen that all left and right displacement of tool plate (10) is accommodated by the deflection of flex-arms (34A) as tool plate (10) moves left and right with respect to linkage plate (30). On the other hand, all top and bottom displacement of tool plate (10) is accommodated by the deflection of link pins (34B) as tool plate (10) and linkage plate (30) move jointly towards the top or bottom with respect to drive plate (20). Since linkage plate (30) does move with respect to drive plate (20), hole (32) through the center thereof must be large enough to accommodate such movement without obstruction. It should be noted that the spindle cam offset as shown in the drawings was made significantly large so that relative displacements of the components would be readily apparent from viewing the drawings. While such displacements would be within the scope of this invention, smaller offsets would be more common, particularly in orbital grinding where the radius of orbits are typically within the range of 0.020 to 0.050-inch (1.27 to 3.81 mm).

Figure 6:
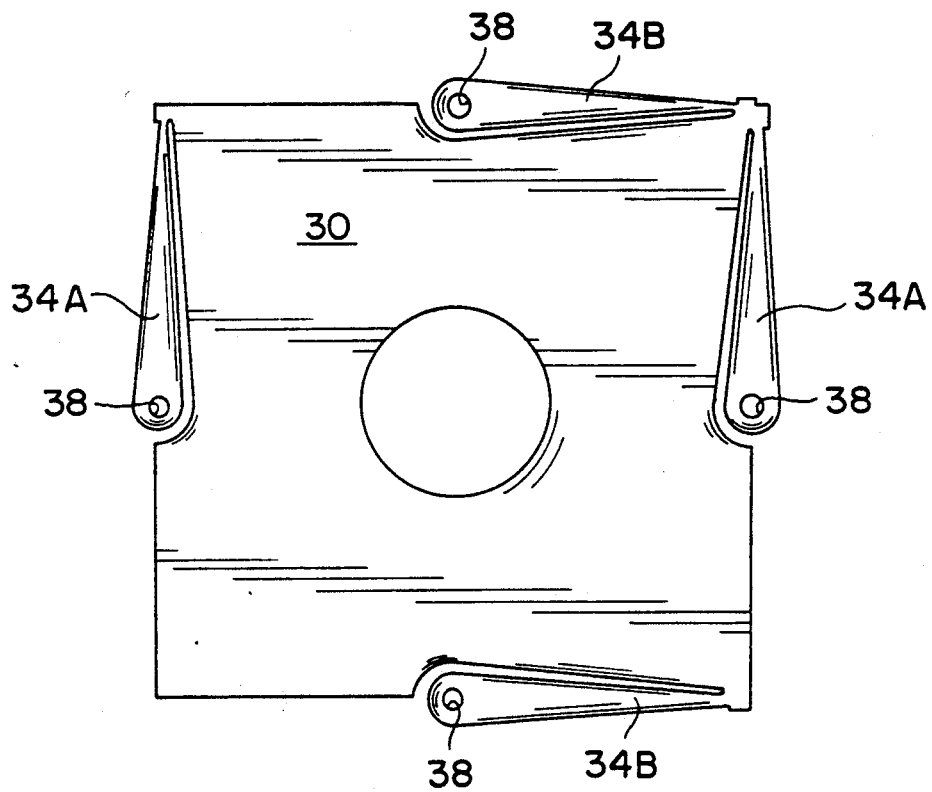
FIG. 6 is a cut-away top view illustrating a modified flex-arm.

As previously noted, holes (38) should fit tightly onto link pins (28) for the purpose of preventing any pivotal rotation of flex-arms (34) about pins (28). If flex-arms (34) are permitted to pivot about pins (28), particularly in the embodiment shown in FIGS. 1-5, the tool plate (10) may wobble somewhat in its orbital path. On the other hand, if the axes of link pins (28) are aligned through the center of flex-arms (34) and such alignment is perpendicular around the four sides of the table, as shown in FIG. 6, then flex-arms (34) can be allowed to pivot on link pins (28) without causing any wobbling. It should be apparent that the power loss in operating the table will be a function of the deflection strength of the link arms (34), which is in turn a function of the dimensions of the arms (34). Accordingly, the thinner that section is, for any given steel plate, the more easily the flex-arms (34) will be able to be deflected and the lower the power loss will be.

It should be apparent that the above-described embodiment of this invention is ideal in its simplicity in that the entire unit is fabricated from simple plate and rod stock with very simple fabrication and machining requirements. It should be apparent that a table of very low profile can be produced by minimizing the thickness the plate stock used in its manufacture, and that the absence of complex hardware would readily permit the other dimensions of the table to be reduced or enlarged as desired. In addition, the power loss can be greatly minimized by fabricating the plates (10, 20 and 30) such that the flex-arms (34) can be easily deflected, i.e. by minimizing the section thickness where the flex-arms (34) are deflected. In addition to the above advantages, it is obvious that numerous modifications and different embodiments could be utilized without departing from the spirit of the invention. For example, it is evident, of course, that the preset radius of orbit can be varied from one table to the next by merely changing the offset distance of spindle cam (26) from the axis of spindle (24). For added life, it should also be obvious that spindle cam (26) could be journaled in a ball or roller bearing instead of the solid bearing (12) as shown. Drive plate (20) could also be produced in many different forms depending on the application where the orbiting table will be utilized, and could in fact be eliminated provided some sort of base member is utilized to support the upper two plates (10 and 30), and to provide a flexible coupling to the free ends of flex-arms (34B) to prevent plate (30) from rotating. Linkage plate (30) could also be fabricated in many different forms, as could flex-arms (34).

Considerable modifications could be made to the flex-arms (34) which could be separate rod type components pivotally affixed at both ends with any form of linkage member that will maintain them in the spaced relationship as shown. In addition, two or more aligned flex-arms could be utilized in place of each flex-arm (34) as shown. All that is necessary is that the arms or rods be rigid so as to prevent rotation of tool plate (10), but yet capable of readily deflecting or pivoting in the direction perpendicular thereto to accommodate the orbital motion. On the other hand, it should be apparent that all that is really necessary is to have a deflecting means that will secure tool plates (10) to linkage plate (30) and secure linkage plate (30) to base plate (20) sufficiently to prevent them from rotating but yet will deflect laterally to allow lateral movement of linkage plate (30) in one direction while allowing lateral movement of tool plate (10) in a direction perpendicular to the aforesaid direction.

While tool plate (10) is shown to have a flat upper surface for simplicity, in usage each tool plate (10) will be provided with suitable means to mount and retain one of the parts to be joined by the friction welding operation. As those of ordinary skill in the art will readily recognize, there is a wide diversity of mechanisms employed in the art and suitable mounting means may generally be selected on the basis of convenience and ready availability, so long as the selected mechanism is sufficiently robust to securely hold the part in proper position and alignment through the welding operation.

Since the circular path of orbit of tool plate (10) is set and defined by the circular path of orbit of spindle cam (26) it is obvious that translational paths other than orbital, such as an elliptical path, for example, could be created by providing a spindle cam which orbits in any such noncircular path. This may be done by providing a cam which changes its distance from the spindle axis as the spindle (24) rotates. Such operation may be effected by a cam which is slideable with respect to the spindle axis and then providing a stationary template that will guide the cam (26) in a noncircular path as defined by the template, not shown.

Figure 7:
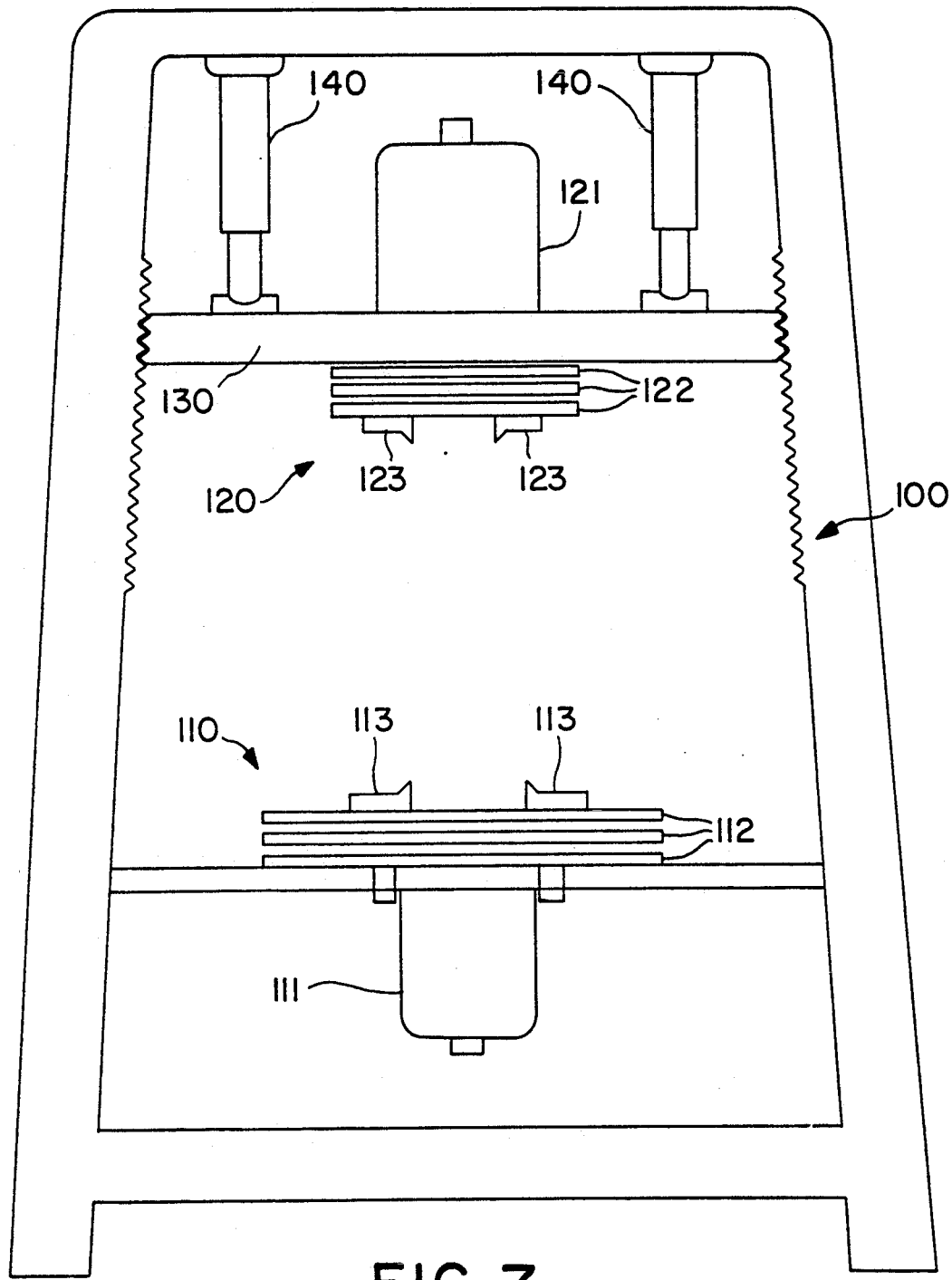
FIG. 7 is a schematic elevation of two orbital tables in opposed configuration for use in the welding operation of the present invention.

As noted, for use in the friction welding method of the present invention, the orbital tables are employed in a paired apposition, mounted face-to-face, and mounted to be urged toward each other at appropriate heating and welding pressure. Such an arrangement is shown in FIG. 7 in schematic form. In FIG. 7, a machine frame (100) carries lower orbital table (110), provided with drive means (111) which actuate the orbital motion, as described above, of driven plates (112). Part mounting mechanism (113) is on the upper face of the upper, orbital table face.

Mounted above the lower orbital table assembly (110) is upper orbital table assembly (120), mounted on a moveable member (130), which may conveniently be a beam slideably mounted on machine frame (100). The moveable member (130) is adapted to be raised and lowered, so that upper orbital table assembly (120) is carried toward and away from lower orbital table assembly (110) by the actuation of beam drive members (140). The beam or other moveable member (130) may be driven by hydraulic cylinders (140), as shown in stylized form in FIG. 7; the drive mechanism (140) may also be a jack screw, or a rack and pinion drive which engages both machine frame (100) and moveable member (130). Still other mechanisms may be employed if desired, so long as the required range of motion necessary to mount parts to be welded is available, the pressure required to heat and weld the particular metals to be joined can be applied, and the alignment of the orbital table assemblies (110 and 120) and the parts to be mounted on them (not shown) are kept in alignment. The alignment and registration of the parts to be welded are conveniently established and maintained by mounting mechanisms (113 and 123).

In operation, the upper orbital table assembly (120) is placed in a retracted position relative to lower orbital table assembly (110) and the parts to be welded are mounted in the upper and lower mounting mechanisms (113 and 123). The upper orbital table assembly (120) is lowered to lightly engage the weld surfaces and the mounting mechanisms (113 and 123) are adjusted to the required alignment and registration. The orbital drives (110 and 120) are actuated in out-of-phase orbits and the beam drive mechanism (1430) is actuated to apply appropriate heating pressure. The orbital motion is continued for the time required to attain welding temperature at the weld interface, at which point the pressure is adjusted to appropriate welding pressure through beam drive mechanism (140) and the orbits of the upper and lower orbital table assemblies (110 and 120) are brought into phase. The pressure is maintained for a period sufficient to attain the weld bond. The welded parts are then removed from the machine.

Linear, reciprocal oscillations are less preferred in the present invention, but for welding parts suited to the limitations of a linear operation, and particularly for a friction welding machine which can be dedicated to welding of specific parts in high volume, these are features which may make such a selection appropriate.

Linear drive mechanisms do not accommodate as wide a variety of joint configurations. In addition, since linear reciprocations involve stopping the motion at each end of the stroke, control of the weld operation is more demanding and difficult. On the other hand, there are countervailing advantages which may be of overriding import in some operations.

First and foremost, as those of ordinary skill in the art will readily recognize, linear reciprocating motion is far simpler to produce, and a very substantial array of suitable mechanisms are available to suit the particular requirements of a specific operation.

An eccentric cam drive will ordinarily be the drive mechanism of choice in producing reciprocating linear oscillations in the present invention, as the simplest, most powerful and the mechanism offering the most facile phase control.

A linear drive pair should not be operated 180° out of phase because both elements will be stopped at the end of a stroke at the same time. It is accordingly preferred that the heating phase of the operation be conducted with the linear drives at about 90° out of phase.

What is claimed is:

1. A machine for precision friction welding mating surfaces of two metal parts comprising:
   A. means for confining a first part in a first driving mechanism adapted to impart a planar oscillatory motion to said first part,
   B. means for confining a second part in a second driving mechanism adapted to impart a planar oscillatory motion to said second part,
   C. means for aligning said first and second driving mechanisms so that the planes of motion of said first part and said second part are parallel and contiguous,
   D. means for driving said first part in said planar oscillatory motion,
   E. means for driving said second part in said planar oscillatory motion out of phase with the motion of said first part to produce relative motion between said first part and said second part,
   F. means for applying pressure between said first part and said second part so that said relative motion produces friction and heat for a time sufficient to raise the temperature of the surfaces of said first part and said second part to welding temperature, and
   G. means for thereafter bringing the motion of the first driving mechanism and the second driving mechanism into phase to stop relative motion between said first part and said second part in alignment while applying weld bonding pressure between said first part and said second part until said parts form a welded bond.

2. A machine for linear precision friction welding mating surfaces of two metal parts comprising:
   A. means for confining a first part in a first driving mechanism adapted to impart a linear motion to said first part,
   B. means for confining a second part in a second driving mechanism adapted to impart a linear motion to said second part,
   C. means for aligning said first and second driving mechanisms so that the lines of motion of said first part and said second part are parallel and contiguous,
   D. means for driving said first part in said linear motion,
   E. means for driving said second part in said linear motion out of phase with the motion of said first part to produce relative motion between said first part and said second part, F. means for applying pressure between said first part and said second part so that said relative motion produces friction and heat for a time sufficient to raise the temperature of the surfaces of said first part and said second part to welding temperature, and G. means for thereafter bringing the motion of the first driving mechanism and the second driving mechanism into phase to stop relative motion between said first part and said second part in alignment while applying weld bonding pressure between said first part and said second part until said parts form a welded bond.

3. A machine for orbital precision friction welding mating surfaces of two metal parts comprising:

A. means for confining a first part in a first driving mechanism adapted to impart a orbital motion to said first part, B. means for confining a second part in a second driving mechanism adapted to impart a orbital motion to said second part, C. means for aligning said first and second driving mechanisms so that the planes of orbit of said first part and said second part are parallel and contiguous, D. means for driving said first part in said orbital motion, E. means for driving said second part in said orbital motion out of phase with the motion of said first part to produce relative motion between said first part and said second part, F. means for applying pressure between said first part and said second part so that said relative motion produces friction and heat for a time sufficient to raise the temperature of the surfaces of said first part and said second part to welding temperature, and G. means for thereafter bringing the motion of the first driving mechanism and the second driving mechanism into phase to stop relative motion between said first part and said second part in alignment while applying weld bonding pressure between said first part and said second part until said parts form a welded bond.

4. A method for precision friction welding mating surfaces of two metal parts comprising the steps of:

A. confining a first part in a first driving mechanism adapted to impart a planar oscillatory motion to said first part;

B. confining a second part in a second driving mechanism adapted to impart a planar oscillatory motion to said second part;

C. aligning said first and second driving mechanisms so that the planes of motion of said first part and said second part are parallel and contiguous;

D. driving said first part in said planar oscillatory motion;

E. driving said second part in said planar oscillatory motion out of phase with the motion of said first part to produce relative motion between said first part and said second part;

F. applying pressure between said first part and said second part so that said relative motion produces friction and heat for a time sufficient to raise the temperature of the surfaces of said first part and said second part to welding temperature; and G. thereafter bringing the motion of the first driving mechanism and the second driving mechanism into phase to stop relative motion between said first part and said second part in alignment while applying weld bonding pressure between said first part and said second part until said parts form a welded bond.

5. A method for linear precision friction welding mating surfaces of two metal parts comprising the steps of:

A. confining a first part in a first driving mechanism adapted to impart a linear motion to said first part;

B. confining a second part in a second driving mechanism adapted to impart a linear motion to said second part;

C. aligning said first and second driving mechanisms so that the lines of motion of said first part and said second part are parallel and contiguous;

D. driving said first part in said linear motion;

E. driving said second part in said linear motion out of phase with the motion of said first part to produce relative motion between said first part and said second part;

F. applying pressure between said first part and said second part so that said relative motion produces friction and heat for a time sufficient to raise the temperature of the surfaces of said first part and said second part to welding temperature; and G. thereafter bringing the motion of the first driving mechanism and the second driving mechanism into phase to stop relative motion between said first part and said second part in alignment while applying weld bonding pressure between said first part and said second part until said parts form a welded bond.

6. A method for orbital precision friction welding mating surfaces of two metal parts comprising the steps of:

A. confining a first part in a first driving mechanism adapted to impart an orbital motion to said first part;

B. confining a second part in a second driving mechanism adapted to impart an orbital motion to said second part;

C. aligning said first and second driving mechanisms so that the planes of motion of said first part and said second part are parallel and contiguous;

D. driving said first part in said orbital motion;

E. driving said second part in said orbital motion out of phase with the motion of said first part to produce relative motion between said first part and said second part;

F. applying pressure between said first part and said second part so that said relative motion produces friction and heat for a time sufficient to raise the temperature of the surfaces of said first part and said second part to welding temperature; and G. thereafter bringing the motion of the first driving mechanism and the second driving mechanism into phase to stop relative motion between said first part and said second part in alignment while applying weld bonding pressure between said first part and said second part until said parts form a welded bond.

* * * * *